(12) United States Patent
Beall et al.

(10) Patent No.: US 6,773,657 B2
(45) Date of Patent: Aug. 10, 2004

(54) METHOD FOR MAKING CORDIERITE HONEYCOMB

(75) Inventors: Douglas M. Beall, Painted Post, NY (US); Christopher J. Malarkey, Corning, NY (US); Gregory A. Merkel, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/174,345

(22) Filed: Jun. 17, 2002

(65) Prior Publication Data

US 2003/0012923 A1 Jan. 16, 2003

Related U.S. Application Data

(62) Division of application No. 09/590,106, filed on Jun. 8, 2000, now Pat. No. 6,432,856.
(60) Provisional application No. 60/174,010, filed on Dec. 30, 1999, and provisional application No. 60/138,930, filed on Jun. 11, 1999.

(51) Int. Cl.[7] .................................................. B28B 3/20
(52) U.S. Cl. ..................................... 264/628; 264/631
(58) Field of Search ............................. 264/42, 43, 44, 264/628, 631

(56) References Cited

U.S. PATENT DOCUMENTS

| | | | |
|---|---|---|---|
| 4,421,699 A | * 12/1983 | Inoguchi et al. | ............. 264/639 |
| 4,722,916 A | * 2/1988 | Watanabe et al. | ............ 501/118 |
| 4,772,580 A | 9/1988 | Hamanaka et al. | |
| 4,849,275 A | 7/1989 | Hamaguchi et al. | |
| 4,869,944 A | 9/1989 | Harada et al. | |
| 4,877,670 A | 10/1989 | Hamanaka et al. | |
| 5,039,644 A | * 8/1991 | Lachman et al. | ............ 502/208 |
| 5,114,644 A | 5/1992 | Beall et al. | |
| 5,262,102 A | 11/1993 | Wada | |
| 5,552,349 A | 9/1996 | Ichii et al. | |
| 5,607,885 A | 3/1997 | Ichii et al. | |
| 5,919,546 A | * 7/1999 | Horiuchi et al. | ............ 428/131 |
| 6,087,281 A | 7/2000 | Merkel | |
| 6,254,963 B1 | * 7/2001 | Kondo | ....................... 428/116 |
| 6,432,856 B1 | * 8/2002 | Beall et al. | ................. 501/118 |

* cited by examiner

*Primary Examiner*—Christopher A. Fiorilla
(74) *Attorney, Agent, or Firm*—Anca C. Gheorghiu

(57) ABSTRACT

A sintered ceramic that exhibits an average linear coefficient of thermal expansion (25–800° C.) below about $5.0 \times 10^{-7}$ °C.$^{-1}$, a total porosity between the range of 20% to about 30%. Furthermore, the sintered ceramic article exhibits a pore size distribution such that at least about 86% of pores are of a pore size of less than about 2 $\mu$m. Lastly, the ceramic article exhibits an interconnected pore structure with the pores exhibiting a generally elongated shape, i.e., the pores are predominately oriented with their long axis in the plane of the webs. This invention also relates to a method for producing a sintered cordierite ceramic article involving first compounding and plasticizing a cordierite-forming inorganic powder batch comprising a platy talc having median particle of size less than about 2 $\mu$m, and preferably a talc morphology index greater than about 0.75. The batch further comprises at least 4% by weight of the inorganic powder batch mixture of a dispersible $Al_2O_3$-forming source having a specific surface area in excess of 50 m$^2$/g and one or more of the components of kaolin, calcined kaolin, silica, and corundum, each having a median particle sizes less than 5 $\mu$m. The plasticized powder batch thus provided is next formed into a green honeycomb by extrusion through a honeycomb extrusion die and the green honeycomb is fired to a temperature and for a time sufficient to convert the green honeycomb into a crystallized cordierite ceramic article having the aforementioned properties.

5 Claims, 3 Drawing Sheets

METHOD FOR MAKING CORDIERITE HONEYCOMB

This application is a divisional of Ser. No. 09/590,106, filed Jun. 8, 2000, now U.S. Pat. No. 6,432,856.

This application claims the benefit of U.S. Provisional Application Nos. 60/138,930, filed Jun. 11, 1999 and 60/174,010 filed Dec. 30, 1999, entitled "Low Expansion, High Porosity, High Strength Cordierite Body and Method", by Beall et al.

BACKGROUND OF THE INVENTION

1. Field of the Invention

The invention relates to cordierite ceramic bodies for use as catalyst carriers, particularly to cordierite bodies, having high thermal shock resistance by virtue of a low coefficient of thermal expansion (CTE), good coatability by a slurry of high surface area activated alumina by virtue of a high level of fine porosity, and a narrow pore size distribution of very fine, generally elongated pores.

2. Discussion of the Related Art

The exhaust gases emitted by internal combustion systems utilizing hydrocarbon fuels, such as hydrocarbon gases, gasoline or diesel fuel, can cause serious pollution of the atmosphere. Among the many pollutants in these exhaust gases are hydrocarbons and oxygen-containing compounds, the latter including nitrogen oxides (NOx) and carbon monoxide (CO). The automotive industry has for many years attempted to reduce the quantities of pollutants from automobile engine systems, the first automobiles equipped with catalytic converters having been introduced in the mid 1970's.

Cordierite substrates, typically in the form of a honeycomb body, have long been preferred for use as substrates to support catalytically active components for catalytic converters on automobiles, in part due to cordierite ceramics' high thermal shock resistance. Honeycomb ceramics having a combination of low thermal expansion coefficient, high level of porosity, and high strength are especially attractive for high-performance automotive catalytic converter substrates having thin webs. Demand for cordierite monoliths having very thin webs is increasing in response to legislation requiring higher conversion efficiencies in catalytic converters for the automobile market. Thinner webs reduce the mass of the substrate resulting in faster light-off times. In addition, higher geometric surface areas may be achieved without an increase in the mass of the substrate. Another advantage of thin walled substrates is that a lower backpressure may be achieved.

Despite the advantages of thin-walled cordierite honeycombs, reducing the thickness of the cell walls reduces the strength of the body. This results in problems canning the catalytic converter. If the strength is reduced sufficiently, the canning process can induce a fracture of the substrate material. Therefore, a high level of material strength is required to offset the reduction in geometric strength encountered when the web thickness is very thin. A high porosity is desirable in order to have a high level of coatability of the high surface area alumina washcoat that is applied to the fired substrate. In addition, a high porosity decreases the thermal mass of the substrate and allows for faster lightoff times for the catalytic converter. A low thermal expansion coefficient is important to prevent failures of the substrate material due to thermal shock. Unfortunately, high levels of porosity and low thermal expansion are known to reduce the strength of a cordierite honeycomb. A low thermal expansion is typically achieved by the presence of microcracking within the cordierite matrix that develops during cooling due to thermal expansion anisotropy. The presence of microcracks within the cordierite matrix serve to limit the strength of the body. A high level of porosity in the matrix also limits the strength of the material., since pores serve to decrease the cross sectional area on which a load is applied.

U.S. Pat. No. 4,849,275 (Hamaguchi et al.) discloses a cordierite honeycomb structural body having a porosity of between 30 to 42% with the total volume of all pores in the body consisting of not less than 70%, preferably not less than 80%, of the pores having a diameter between 0.5 to 5.0 $\mu$m. U.S. Pat. No. 4,869,944 (Harada et al.) discloses a cordierite body exhibiting a CTE of not greater then $3 \times 10^{-7}/°$ C. in the axial direction and having a porosity of between 30 to 42% and having a porosity in which $\geq 40\%$ of the total pores are between 0.5 to 5.0 $\mu$m and $\leq 30\%$ of the total pores are $\geq 10$ $\mu$m. Although these references each disclose a narrow distribution of fine pores and a sufficiently low CTE, the total porosities disclosed exceed 30%, and they do not disclose, nor do any of the examples exhibit, a narrow pore size distribution of fine enough, elongated and oriented, pores necessary to produce a cordierite body having both a low CTE less than $5 \times 10^{-7}/°$ C. and a sufficiently high strength.

U.S. Pat. No. 4,877,670 (Hamanaka) discloses cordierite bodies having a low CTE less than $10 \times 10^{-7}/°$ C. and a low total volume of pores greater than 5 $\mu$m, preferably greater than 2 $\mu$m. Although the reference discloses a narrow range of fine pores it does not disclose the combination of a narrow distribution of fine pore sizes, and there is no disclosure regarding the requirement of elongated, oriented pores necessary to ensure the formation of cordierite bodies possessing the property combination of high strength and low CTE of less than $5 \times 10^{-7}/°$ C. 5.

U.S. patent application Ser. No. 09/348,307 (Merkel et al.) discloses cordierite bodies exhibiting a CTE of $\leq 4 \times 10^{-7}/°$ C. with at least 85% of the total porosity having a mean pore diameter of between 0.5 to 5.0 $\mu$m. A second embodiment is disclosed and comprises a cordierite body exhibiting a CTE of between 4 to $6 \times 10^{-7}/°$ C. and having a total porosity of at least 30 vol % with at least 85% of the total porosity having a pore diameter of between 0.5 to 5.0 $\mu$m. Once again this reference discloses a narrow distribution fine pores, however there is no disclosure of the elongated, oriented pore structure and narrow distribution of very fine pore sizes that is required to produce cordierite possessing a combination of high strength and low CTE.

It is therefore a principal object of the present invention to provide improved cordierite ceramics, and method for making them, that exhibit a low thermal expansion, high total porosity, high strength, and narrow pore size distribution of small elongated, oriented pores.

SUMMARY OF THE INVENTION

The present invention provides for a sintered ceramic substrate and method for making the ceramic substrate, having a primary crystalline phase comprising cordierite and exhibiting a low thermal expansion and high total porosity. The porosity is uniquely comprised of small pores of a narrow size distribution and a generally elongated shape which are believed to contribute substantially to the unexpectedly high strength of these low CTE substrates.

Specifically, the sintered ceramic article of the invention exhibits an average linear coefficient of thermal expansion (25–800° C.) below about 5.0×10⁻⁷/° C., a total porosity between the range of 20% to about 30%. Furthermore, the sintered ceramic article exhibits a pore size distribution such that at least about 86% of pores are of a pore size of less than about 2 μm. Lastly, the ceramic article exhibits an interconnected pore structure with the pores exhibiting a generally elongated shape with the pores being predominately oriented with their long axis in the plane of the webs.

This invention also relates to a method for producing a sintered cordierite ceramic article involving first compounding and plasticizing a cordierite-forming inorganic powder batch comprising a talc having median particle of size less than about 2 μm, preferably a platy talc having a morphology index greater than about 0.75. The batch further comprises at least 4% by weight of the inorganic powder batch mixture of a dispersible $Al_2O_3$-forming source having a specific surface area in excess of 50 m²/g and one or more of the components of kaolin, calcined kaolin, silica, and corundum, each having a median particle sizes less than 5 μm.

The plasticized powder batch thus provided is next formed into a green honeycomb by extrusion through a honeycomb extrusion die and the green honeycomb is fired to a temperature and for a time sufficient to convert the green honeycomb into a crystallized cordierite ceramic article having the aforementioned properties.

DETAILED DESCRIPTION OF THE INVENTION

Figure 1:
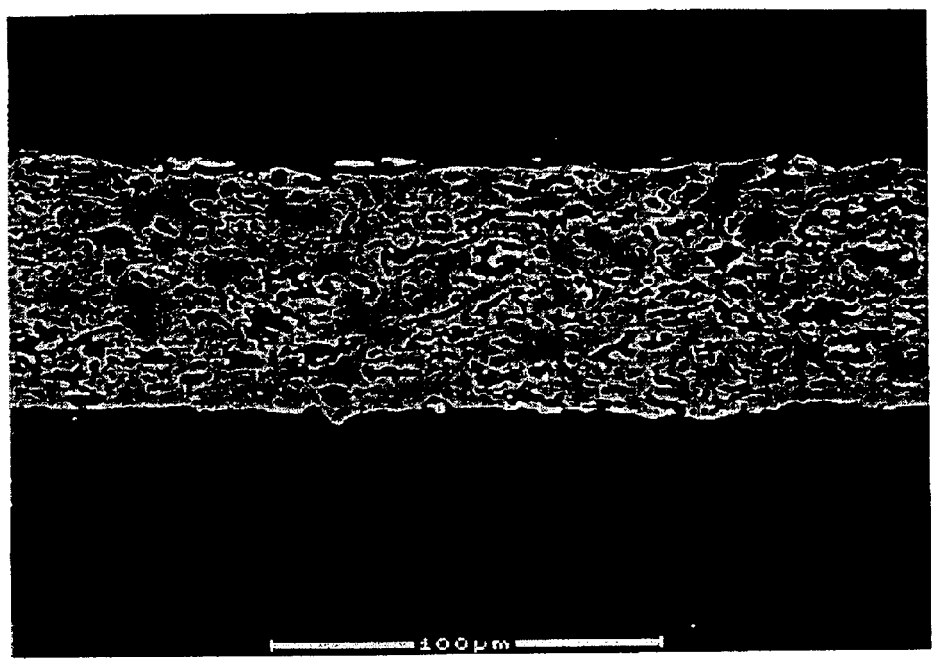
FIG. 1 is a scanning electron micrograph taken at 500× magnification of the inventive cordierite body according to the invention

The cordierite body according to the invention combines the attractive attributes of a thin-walled cordierite honeycomb body of good thermal shock resistance, as a virtue of a low thermal expansion coefficient (CTE) of less than about 5.0×10⁻⁷/° C., with a good coatability of the alumina washcoat, as a virtue of high level of total porosity (>20%, but less than 30%) and an interconnectivity of the pore structure, and high strength as a virtue of a very fine pore size distribution, specifically a distribution where at least about 86% of pores exhibit an average size of less than about 2 μm, along with a degree of orientation of the pores wherein the pores are predominately aligned with their long axis lying along the plane of the webs. According to this invention, CTE's are the mean expansions from 25–800° C. measured by dilatometry; regarding honeycombs it is the mean expansion along the direction parallel to the length of the open channels.

The shape and orientation of the pores have an impact on the strength of the cordierite honeycomb. Cordierite bodies having elongated pores that are oriented perpendicular to the applied stress, exhibit an increased strength over those cordierite bodies exhibiting spherically shaped randomly oriented pores, due to a reduction of the stress concentration.

In order to obtain a cordierite body possessing the unique combination of properties described above it is necessary to utilize a specific combination of very fine average particle size, high surface area raw materials in the batch mixture. Particle size as used herein is expressed as the mean particle diameter, as measured by a sedimentation technique.

In accordance with the present invention, provided is a plasticizable mixture for use in preparing the ceramic article above with the mixture comprising (a) a very fine, talc having median particle size less than about 2 μm; (b) a dispersible $Al_2O_3$-forming source, selected from the group transitional aluminas, aluminum hydroxide, or aluminum oxide hydroxide, the $Al_2O_3$ having a specific surface area in excess of 50 m²/g and accounting for at least 4% by weight of the plasticizable inorganic mixture; (c) at least one of a kaolin, calcined kaolin, silica, and corundum, each of which, preferably exhibiting a median particle sizes less than 5 μm.

In a preferred embodiment the talc is a platy talc, meaning a talc that exhibits a platelet particle morphology, that is, particles having two long dimensions and one short dimension, or, a length and width of the platelet that is much larger than its thickness. It is preferred that the talc possesses a morphology index greater than about 0.75. The morphology index (refer to U.S. Pat. No. 5,141,686) is a measure of the degree of platiness of the talc. One typical procedure for measuring the morphology index is to place the sample in a holder so that the orientation of the platy talc is maximized within the plane of the sample holder. The x-ray diffraction pattern is then determined for this oriented talc. The morphology index semi-quantitatively relates the platy character of the talc to its XRD peak intensities using the following equation:

$$M = \frac{I_x}{I_x + 2I_y}$$

where $I_x$ is the intensity of the (004) peak and $I_y$ is that of the (020) reflection.

By $Al_2O_3$-forming source is meant $Al_2O_3$ itself or other material having low water solubility which when fired converts to $Al_2O_3$. Some typical $Al_2O_3$-forming components include alumina, $Al(OH)_3$ (also known as aluminum trihydrate or the mineral gibbsite), or aluminum oxide hydroxide (also known as aluminum monohydrate or the mineral boehmite or pseudo-boehmite).

Dispersible high surface area $Al_2O_3$-forming component or source can be provided as the powder or as a sol. By dispersible is meant that the agglomerates of very fine particles can be broken up and dispersed into the constituent particles having a mean particle diameter of less than about 0.3 micrometers. By high surface area is meant a surface area greater than 50 m²/g, more preferably greater than about 100 m²/g. Such powders can include boehmite, pseudobohemite, gamma-phase alumina, delta-phase alumina, or other so called transition aluminas. In a preferred embodiment the dispersible high surface area $Al_2O_3$-forming component or source comprises boehmite having a surface area in excess of 150 m²/g.

The dispersible $Al_2O_3$-forming source, for the purposes of the instant invention is a compound which, when heated, forms $Al_2O_3$.

The mean particle diameter of the kaolin, if present should range between about 0.2 to 2.0 μm, and should comprise less than about 35%, by weight, of the total raw material batch. The balance of the $Al_2O_3$ required to form cordierite is supplied by calcined kaolin or the $Al_2O_3$-forming source, and the balance of the $SiO_2$ being provided by calcined kaolin or silica powder. Preferably, the silica present is in the form of silica particles with very high surface area (>50 m²/gm). If calcined clay is used, it should be very fine, preferably with average particle size less than 21 μm, and more preferably less than 1 μm with a surface area >10 m²/gm.

The aforementioned raw materials of which the plasticized mixture is comprised are combined in a mixing step sufficient to produce an intimate mixing of the raw material phases to allow complete reaction in thermal processing. A binder system is added at this point to help create an extrudable mixture that is formable and moldable. A preferred binder system for use in the present invention comprises a cellulose ether binder component selected from the group consisting of methylceflulose, methylceflulose derivatives, and combinations thereof a surfactant component, preferably stearic acid or sodium stearate, and a solvent comprising water. Excellent results have been obtained utilizing a binder system which comprises the following amounts, assuming 100 parts by weight of the inorganic, alumina and silica forming sources and talc, raw material mixture: about 0.2 to 2 parts by weight of the sodium stearate, about 2.5 to 6.0 parts by weight of a methylcellulose or a hydroxypropyl methylcellulose binder, and about 20–50 parts by weight of the water.

In a separate embodiment, a preferred binder system for use in the present invention comprises cellulose ether binder component a selected from the group consisting of methylcellulose, methylcellulose derivatives, and combinations thereof, a non-solvent component comprising polyalphal olefin, a surfactant component selected from the group consisting of, stearic acid, ammonium lauryl sulfate, lauric acid, oleic acid, palmitic acid and combinations thereof and a solvent comprising water. Excellent results have been obtained utilizing a binder system which comprises the following amounts, assuming 100 parts by weight of the inorganic raw material mixture: about 2 to 10 parts by weight of the polyalphal olefin, about 0.2 to 2 parts by weight of the surfactant component, about 2.5 to 5 parts by weight of a hydroxypropyl methylcellulose binder, and about 8 to 25 parts by weight of the water.

The individual components of the binder system are mixed with a mass of the inorganic powder material in a suitable known manner, to prepare an intimate mixture of the ceramic material and the binder system capable of being formed into a ceramic body by, for example, extrusion. The resulting stiff, uniform and extrudable batch mixture is then shaped into a green body by any known conventional ceramic forming process, such as, e.g. extrusion, injection molding, slip casting, centrifugal casting, pressure casting, dry pressing, etc. For the preparation of a thin-walled honeycomb substrate suitable for use as a catalyst support, extrusion through a die is preferable. The prepared ceramic green body is then dried and fired at a sufficient temperature for a sufficient time to result in a fired ceramic body containing cordierite as its primary phase. The drying and firing conditions can vary depending on the process conditions such as specific composition, size of the green body, and nature of the equipment.

The body may be dried by any conventional method such as hot-air drying or dielectric drying, with dielectric being the preferred method.

The firing range for the formed cordierite body should be 1340–1440° C. with a soak time sufficient to yield a substantially complete reaction to the cordierite phase; Soak times of 6–12 hours may be used. The resulting fired body, preferably, at least about 95% by weight cordierite.

To further illustrate the principles of the invention of the present invention, included is an example of the cordierite bodies according to the invention, along with two comparative examples. However, it is to be understood that the examples are given for illustrative purpose only, and the invention is not limited thereto, but various modifications and changes may be made in the invention, without departing from the spirit of the invention.

EXAMPLES

Inorganic powder batch mixtures, as listed in percent by weight, suitable for the formation of ceramic body having cordierite as its primary crystalline phase are listed in Table I. Batch mixtures, inventive composition 1 and comparative composition 2, were prepared by combining and dry mixing together the components of the designated inorganic mixture as listed in Table I. Note that composition 1 includes an boehmite having a surface area of 180 m²/g and a platy talc having a morphology index of 0.91, while comparative composition 2 lacks a highly dispersible $Al_2O_3$ and the talc included exhibited a morphology index of between 0.7 and 0.75. To these mixtures were added the amount of the organic binder system listed in Table I and these intermediate mixtures were thereafter further mixed with deionized water to form plasticized ceramic batch mixtures. The binder system components, as detailed in Table I are listed in parts by weight, based on 100 parts total inorganics. Table I also reports the average particle size (μm) of the commercially available raw materials utilized in batch materials. Note that all of the particle sizes of the composition 1 are of a submicron average particle size, while comparative composition 2 includes a talc having an average particle size of 6 μm.

The plasticized mixture was extruded through an extruder under conditions suitable to form an approximately. 5 in. long, 816 cell/in² honeycomb substrate having about a 3 in. diameter and 2.72 mils thick cell walls. The green honeycomb formed from the compositions were sufficiently dried to remove any water or liquid phases that might be present and thereafter subjected to a heating and firing cycle sufficient to remove the organic binder system from, and to sinter, the extruded rods and honeycombs. Specifically, the green bodies were fired to between about 1380–1420° C. and held for a period of about 8 hours; i.e., firing conditions suitable for forming ceramic bodies having cordierite as their primary phase.

TABLE I

BATCH COMPOSITION IN WEIGHT PERCENT
(mean particle size measured by sedimentation technique, in μm, given in parenthesis)

| RAW MATERIAL | Inventive Composition 1 | Comparative Composition 2 |
| --- | --- | --- |
| INORGANICS | | |
| Talc | 39.95 (1.5) | 40.86 (6.6) |
| Kaolin | 16.55 (0.8) | 12.04 (0.8) |
| Calcined Kaolin | 24.73 (0.8) | 29.68 (0.8) |
| $Al_2O_3$ | 5.73 (0.6) | 15.43 (0.4) |
| ALOOH—$xH_2O$ (180 m²/g) | 11.05 (0.1) | — |
| Silica | 2.0 (3.8) | 2.0 (3.8) |
| ORGANICS | | |
| Methocel | 5.0 | |
| Lubricant | 1.0 | 0.5 |
| Oil | 8.0 | 6.0 |

Table II reports selected properties for the ceramic produced from the batches of composition 1 and comparison composition 2 reported in the Table I. Comparative Example 3 lists representative properties of a series of comparative cordierite bodies exhibiting the porosity properties detailed in the aforementioned Hamaguchi reference; specifically a porosity of between 30 to 42%, with the total volume of all pores in the body consisting of not less than 70% of the pores having a diameter between 0.5 to 5.0 μm, specifically 71–73%. Properties included for the ceramic bodies are the modulus of rupture strength (MOR) of the rods, in psi, the average coefficient of thermal expansion (CTE) of the rods over the temperature range from about 25° C. to 800° C. (×10$^{-7}$° C.), the total porosity of the ceramic, expressed in volume percent, and the percentage of pores having a average size of less than 2 micrometers, both porosites as measured by Hg porosimetry. Furthermore, Table I includes the hydrostatic isostatic strength and the A, B, and C-axis crush strengths, each as measured in psi.

TABLE III

| Properties of Fired Cordierite Bodies | Composition No. 1 | Comparative Composition No. 2 | Comparative Ex. No. 3 |
|---|---|---|---|
| Cell Density | 816 | 900 | 811 |
| Web Thickness | 2.72 | 2.70 | 2.72 |
| CTE | 3.7 | 5.0 | 3.2 |
| % Porosity | 26.8 | 25.3 | 31.9 |
| % Porosity <2 μm | 92 | 41 | 20–22 |
| MOR (psi) | 361 | 288 | 270 |
| Hydrostatic Isostatic Strength FN (psi) | 200 | 145 | 75 |
| A-Axis Crush Strength (psi) | 3640 | 2120 | 1190 |
| B-Axis Crush Strength (psi) | 313 | 224 | 86 |
| C-Axis Crush Strength (psi) | 25 | 31 | 11 |

An examination of the table reveals that the inventive sample possesses the claimed porosity comprising a total porosity between the range of 20% to about 30%, specifically 26.8%, and a pore size distribution such that at least about 86% of pores exhibit a pore size of less than about 2 μm, specifically 92%. Furthermore, the inventive sample exhibits a low CTE of 3.7×10/° C. along with a sufficiently high strength of 361 psi. The comparative samples, on the other hand, possess <2 μm percentage distributions far below that of the inventive sample, 41% and 19% respectively, along with lower strengths of 270 and 288 psi.

FIG. 1 is a SEM, taken at 500×, of polished web section of a ceramic body formed from the above composition 1; a 900 cpsi cordierite honeycomb structure with a web thickness of 0.0027 in. An examination of FIG. 1 reveals a pore structure of narrow, finely distributed, and generally elongated pores that are oriented along the plane of the ceramic body web. Specifically, FIG. 1 reveals that the average pore diameter is just under 1 μm as measured by Hg porosimetry and that very few large pores are found in this body.

Figure 2:
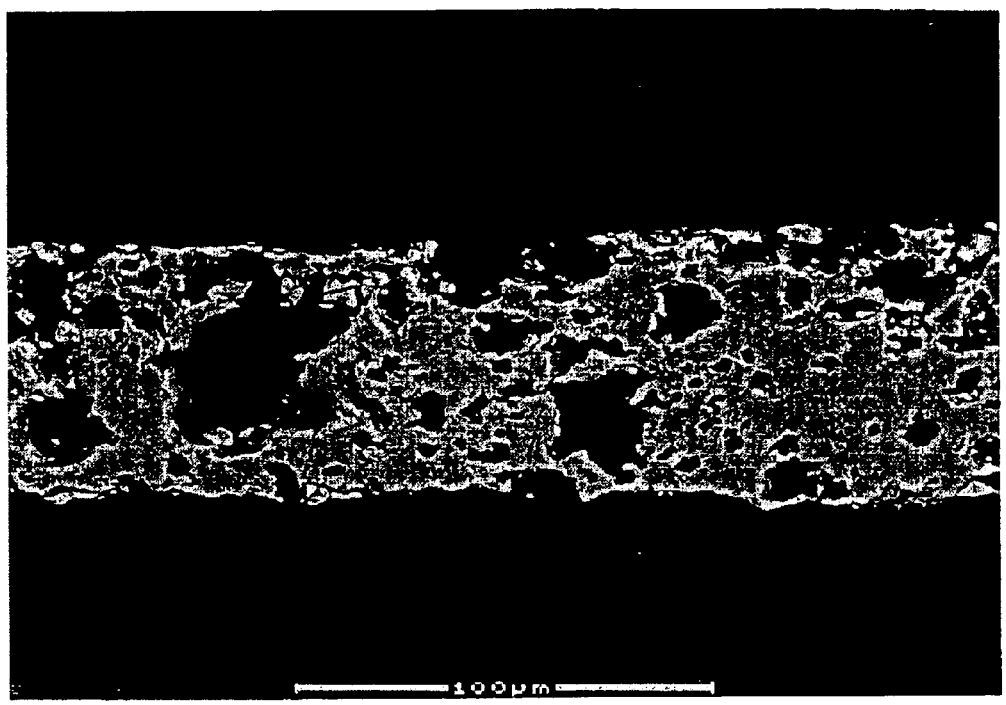
FIG. 2 is a scanning electron micrograph taken at 500× magnification of the comparison cordierite body of composition 2.

FIG. 2 is a SEM, taken at 500×, of polished web section of a ceramic body of comparative example 3; again a 900 cpsi cordierite honeycomb structure with a web thickness of 0.0027 in. formed to achieve the aforementioned porosity detailed in the Hamaguchi reference. An examination of FIG. 2 reveals a pore structure of roughly spherical pores with no particular elongation or orientation. Specifically, FIG. 2 reveals that the average pore diameter is greater than 3 μm as measured by Hg porosimetry and seen are a number of pores with diameters of up to 30 μm in diameter; it is the presence of these pores that are likely responsible for the reduced strength of this particular body.

Figure 3:
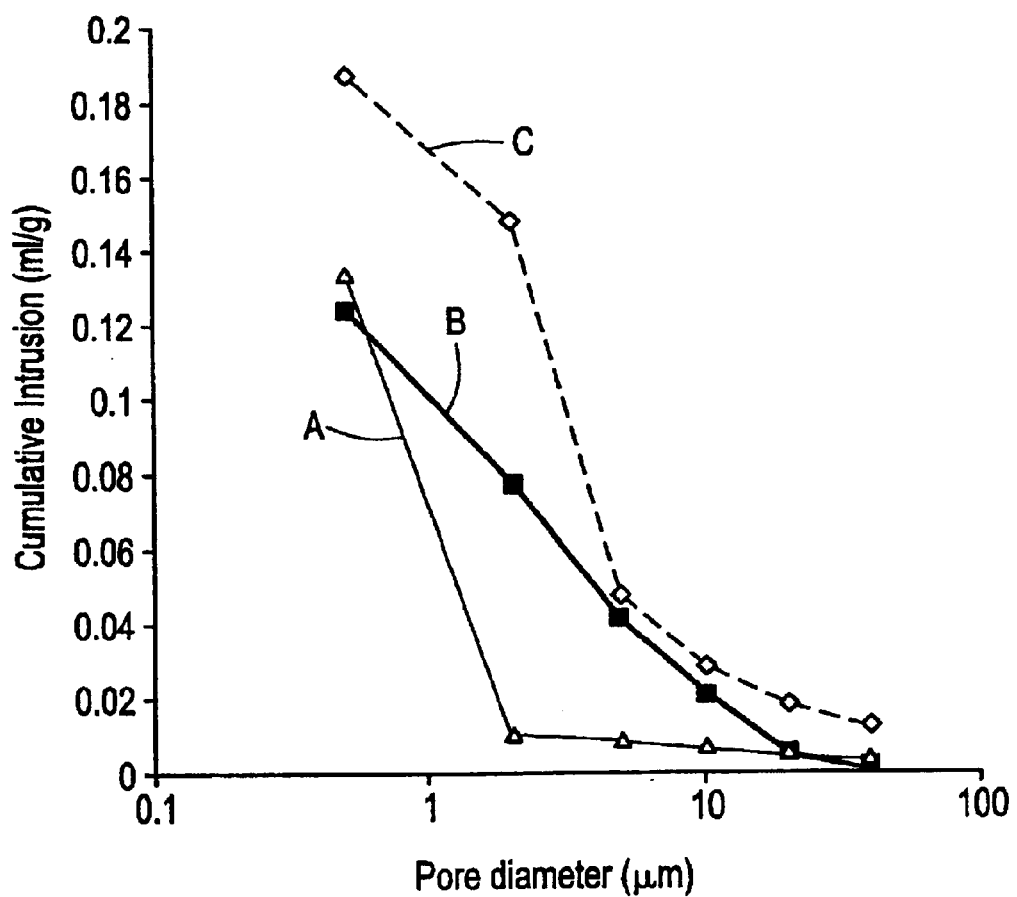
FIG. 3 is a graph illustrating the relationship of cumulative intrusion versus pore diameter of the inventive example 1 and two comparison examples 2 and 3.

FIG. 3 is a graph illustrating the relationship of cumulative intrusion versus pore diameter (porosity distributions) of the cordierite body made from inventive composition example 1, plot designated A, and two comparison cordierite bodies; plot designations B and C corresponding to comparison example 2 and 3, respectively. The measurements reported in this graph were made with a Hg porosimeter. The points on the curves correspond to cumulative intrusion volume at 40, 20, 10, 5, 2, and 0.5 micrometers. It can be seen from the curves that the inventive body, plot A, has a much narrower pore size distribution than either of the comparative bodies. In fact, almost all of the porosity is found below 2 μm, while the comparative bodies show a broad distribution with a significant volume of porosity above 2 μm.

It should be understood that while the present invention has been described in detail with respect to a certain illustrative and specific embodiment thereof, it should not be considered limited to such, as numerous modifications are possible without departing from the broad spirit and scope of the present invention as defined in the appended claims.

We claim:

1. A method for making an extruded fired cordierite honeycomb article comprising the steps of:

(a) compounding and plasticizing a cordierite-forming inorganic powder batch comprising a talc having median particle size less than about 2 μm, at least 4% by weight of the inorganic powder batch mixture consisting of a dispersible Al$_2$O$_3$-forming source having a specific surface area in excess of 50 m$^2$/g, and one or more components selected from the group of kaolin, calcined kaolin, silica, and corundum, each having a median particle size less than 5 μm;

(b) forming the plasticized powder batch into a green honeycomb by extrusion through a honeycomb extrusion die; and, (c) firing the green honeycomb to a temperature and for a time sufficient to convert the green honeycomb into a crystallized cordierite ceramic article having an average linear coefficient of thermal expansion (25–800° C.) below about 5.0×10$^{-7}$° C.$^{-1}$, and exhibiting a total porosity between the range of 20% to about 30%, and a pore size distribution such that at least about 86% of pores exhibit a pore size of less than about 2 μm.

2. The method according to claim 1 wherein the talc comprises a platy talc having a morphology index greater than about 0.75.

3. The method according to claim 1 wherein the dispersible Al$_2$O$_3$-forming source exhibits a specific surface area in excess of 100 m$^2$/g.

4. The method according to claim 1 wherein the dispersible Al$_2$O$_3$-forming source is boehmite having a surface area greater than about 150 m$^2$/g.

5. The method according to claim 1 wherein the crystallized cordierite ceramic article exhibits an interconnected pore structure with the pores exhibiting a generally elongated shape and predominately oriented with their long axis in the plane of webs, an MOR strength of greater than about 300 psi, and an A-axis crush strength of greater than 3640 psi.

* * * * *